United States Patent [19]

Leverett

[11] Patent Number: 4,482,061

[45] Date of Patent: Nov. 13, 1984

[54] APPARATUS AND PROCESS FOR SORTING ARTICLES

[75] Inventor: William H. Leverett, Greenville, Ga.

[73] Assignee: Durand-Wayland, Inc., LaGrange, Ga.

[21] Appl. No.: 233,338

[22] Filed: Feb. 11, 1981

Related U.S. Application Data

[63] Continuation-in-part of Ser. No. 963,581, Nov. 24, 1978, Pat. No. 4,273,649, and a continuation-in-part of Ser. No. 79,429, Sep. 27, 1979, Pat. No. 4,262,807.

[51] Int. Cl.³ .............................................. B07C 5/16
[52] U.S. Cl. .................................. 209/592; 198/384; 198/576; 198/779; 209/556; 209/701; 209/912
[58] Field of Search ............... 209/555, 701, 539, 556, 209/934, 912, 629, 698, 545, 540, 592, 593, 594, 596, 564, 580, 581, 582, 587; 198/384, 387, 779, 576, 575

[56] References Cited

U.S. PATENT DOCUMENTS

| | | | |
|---|---|---|---|
| 2,731,146 | 1/1956 | Page .................................. | 209/912 X |
| 3,013,661 | 12/1961 | Strubhar .......................... | 209/587 X |
| 3,206,022 | 9/1965 | Roberts et al. ................... | 209/912 X |
| 3,305,066 | 2/1967 | Elford et al. ..................... | 198/576 X |
| 3,770,111 | 11/1973 | Greenwood et al. ........... | 209/644 X |
| 4,106,628 | 8/1978 | Warkentin ....................... | 209/698 X |
| 4,246,098 | 1/1981 | Conway et al. ...................... | 209/912 |
| 4,254,877 | 3/1981 | Rose ................................. | 209/698 X |
| 4,308,959 | 1/1982 | Hoover et al. ...................... | 209/587 |
| 4,353,455 | 10/1982 | Mumma et al. ..................... | 198/384 |

FOREIGN PATENT DOCUMENTS 2735987 3/1979 Fed. Rep. of Germany ...... 198/779

Primary Examiner—David A. Scherbel
Assistant Examiner—Donald T. Hajec
Attorney, Agent, or Firm—Newton, Hopkins & Ormsby

[57] ABSTRACT

Successive pairs of rollers in a plurality of juxtaposed continuous feed chain conveyors receive articles, such as fruits and vegetables at an upstream portion of a sorting conveyor system and by movement of the rollers between inclined walls, position the articles in succession so as to pass the same through color sortors and, then, below pneumatic rollers to deposit them into successive cups of a sorting conveyor system. Excess articles on the feed conveyors are released near the downstream end of the feed conveyors and are returned to their upstream end for reprocessing. Adjustable synchronizing linkage tie the two systems together and permit the relative adjustment of the positions of the cups with respect to the positions of the rollers. Spinning of the rollers is accomplished by the rollers riding in the through assemblies for the upper flights of the feed conveyors. Rails lift the rollers when they are not to spin. The color sortor examines the articles as they are spun by the rollers. The cups form a part of a soring conveyor system for dropping the articles according to prescribed color and/or weight.

7 Claims, 5 Drawing Figures

APPARATUS AND PROCESS FOR SORTING ARTICLES

CROSS-REFERENCE TO RELATED APPLICATIONS

This application is a continuation in part of my copending application Ser. No. 963,581, filed Nov. 24, 1978, now U.S. Pat. No. 4,273,649 issued June 16, 1981, and application Ser. No. 079,429, filed Sept. 27, 1979, now U.S. Pat. No. 4,262,807 issued Apr. 21, 1981.

BACKGROUND OF THE INVENTION

1. Field of the Invention

This invention relates to an apparatus and process of sorting articles and is more particularly concerned with a feed mechanism and sorting mechanism for arranging articles, such as fruits and vegetables, in succession and depositing the same in cups for subsequent processing according to pre-determined criteria, such as color and/or weight.

2. Description of the Prior Art

In the past, articles have been sorted according to color and/or weight. The patent to Irving, U.S. Pat. No. 3,750,883 discloses one system of sorting, according to color wherein light reflected from the red portions and the green portions of articles, such as apples are converted to analog signals the ratio of which are compared so as to dictate the accumulation of articles according to the color of the article.

The patent to Warkentin, U.S. Pat. No. 4,106,628, discloses still another method of sorting articles, according to weight or color, or both. The patent to Warkentin employs spools for arranging the articles in succession and for subsequently depositing such articles into cups for weighing. The article can be examined according to color while on the spools. Signals generated by the red and green color of the article are employed for separating the articles according to color and a strain gauge is employed for weighing each article so that the weight can be employed for such sorting.

The patent to Drew, U.S. Pat. No. 4,024,053, discloses still another system which employs a conveyor and a microprocessor for sorting of articles, according to weight. The patent to Hoover, U.S. Pat. No. 2,908,375, discloses the transfer of articles from the feed conveyor to successive cups in a second conveyor. The patent to Strubhar, U.S. Pat. No. 3,013,661, discloses the color sorting of articles as they are being spun by rollers. Spools are also taught in the patent to Mumma, U.S. Pat. No. 3,017,024, for handling eggs and classifying the same. This patent discloses the use of cups. The patent to Clukey, U.S. Pat. No. 3,032,191, also discloses the use of cups for weighing and separating articles.

U.S. Pat. No. 3,770,111 issued to Greenwood, et al. discloses the use of successive conveyors, the first conveyor being employed with the upper flight of the conveyor between inclined walls for sorting. The patent to Conway discloses the use of cups which carry fruit beneath an optical scanner so as to detect the color thereof and subsequently drop the article according to its color, from the cup. The patent to Paddock, U.S. Pat. No. 3,930,995 discloses the use of cups which support successive articles for classification.

The patent to Rose, U.S. Pat. No. 3,901,334, discloses the use of spindles which carry articles for discharge from a first conveyor system into a plurality of cups in a second conveyor system.

SUMMARY OF THE INVENTION

Briefly described, the present invention includes a first chain conveyor system which has a plurality of juxtaposed conveyor chains having transversely extending rollers shafts in the chain linkage. Each roller shaft supports a pair of opposed frusto conical rollers which taper inwardly toward the central chain. The rollers are arranged in succession and four rollers support an article. When the chain is lifted by a central rail off of a trough, rollers do not rotate; however, when the lower periphery of the rollers engage the trough, the rollers rotate to thereby rotate an article carried thereon. Inclined walls direct the articles onto the upper flights of the juxtaposed conveyors so that the articles are arranged in succession. A return conveyor mechanism in the lower portion of the first conveyor system receives any excess articles and carries them back to the upstream end of the first conveyor system.

After the dropping of excess articles, the first conveyor system transports the spinning articles beneath a color sorter where each article is examined according to color and generate analog signals received from the reflection of light on these articles is fed to a microprocessor. The articles are then deposited on cups of conveyors into a second conveyor system, the conveyors of the second conveyor system being aligned with the conveyors of the first conveyor system. These cups transport the articles over weighing stations and are actuated downstream, according to the program of the computer.

An adjustable synchronizing linkage connects the first and second conveyor systems and permits relative adjustment between the two so as to permit the discharge of the successive articles from the first conveyor system into the cups of the second conveyor system. This adjustable linkage includes a continuous chain drive which synchronizes the two systems and a take-up assembly which will adjust the chain with respect to the two conveyor systems.

Accordingly, it is an object of the present invention to provide an apparatus and process for sorting articles wherein successive conveyor systems are synchronized so as to enable the accurate discharge of articles from one conveyor system to the next.

Another object of the present invention is to provide an apparatus and process for sorting articles which is inexpensive to manufacture, durable in structure and efficient in operation.

Another object of the present invention is to provide an apparatus and process for sorting articles wherein the articles randomly deposited in an area, are readily and easily separated into succession for individual scanning according to color and for individual weighing so that the articles may be discharged according to color and/or weight.

Another object of the present invention is to provide in an apparatus and process for sorting articles, a system which will readily and easily spin articles so that they may be accurately scanned and will also position such articles so that they may be accurately weighed.

Another object of the present invention is to provide an apparatus and process for sorting articles wherein the excess of articles fed to the system will be automatically handled.

DESCRIPTION OF THE PREFERRED EMBODIMENT

Figure 1:
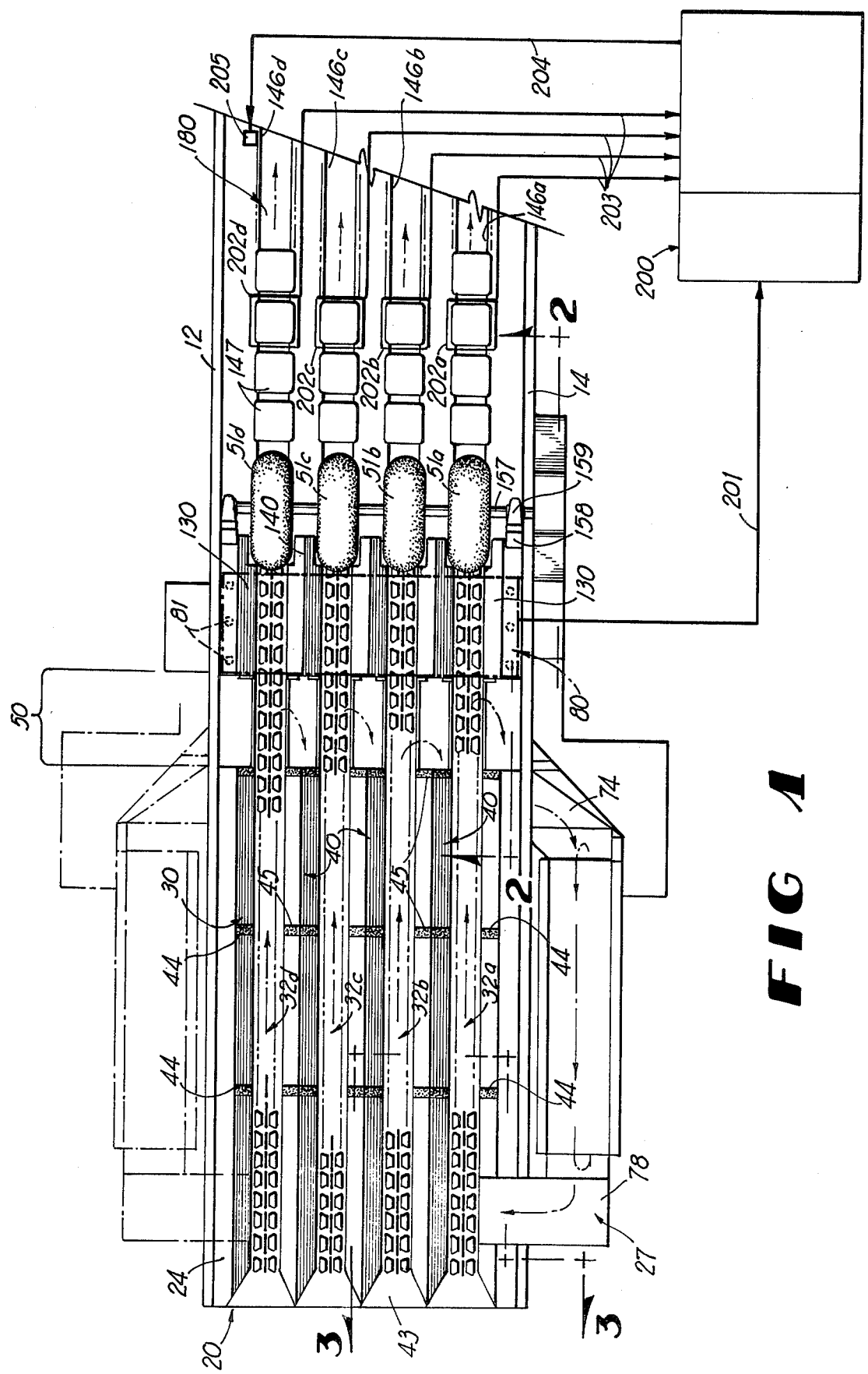
FIG. 1 is a fragmentary schematic top plan view of an apparatus for sorting articles, constructed in accordance with the present invention.

Referring now in detail to the embodiment chosen for the purpose of illustrating the present invention, numeral 10 denotes generally the frame structure of the apparatus of the present invention. This frame structure 10 includes a pair of longitudinally extending side channels 11 and 12 which are disposed in opposed parallel relationship with their webs, such as web 13, being disposed vertically. The upper ends of the channels 12 and 13 are provided with outwardly protruding upper flanges such as flange 14 in FIG. 3.

Figure 3:
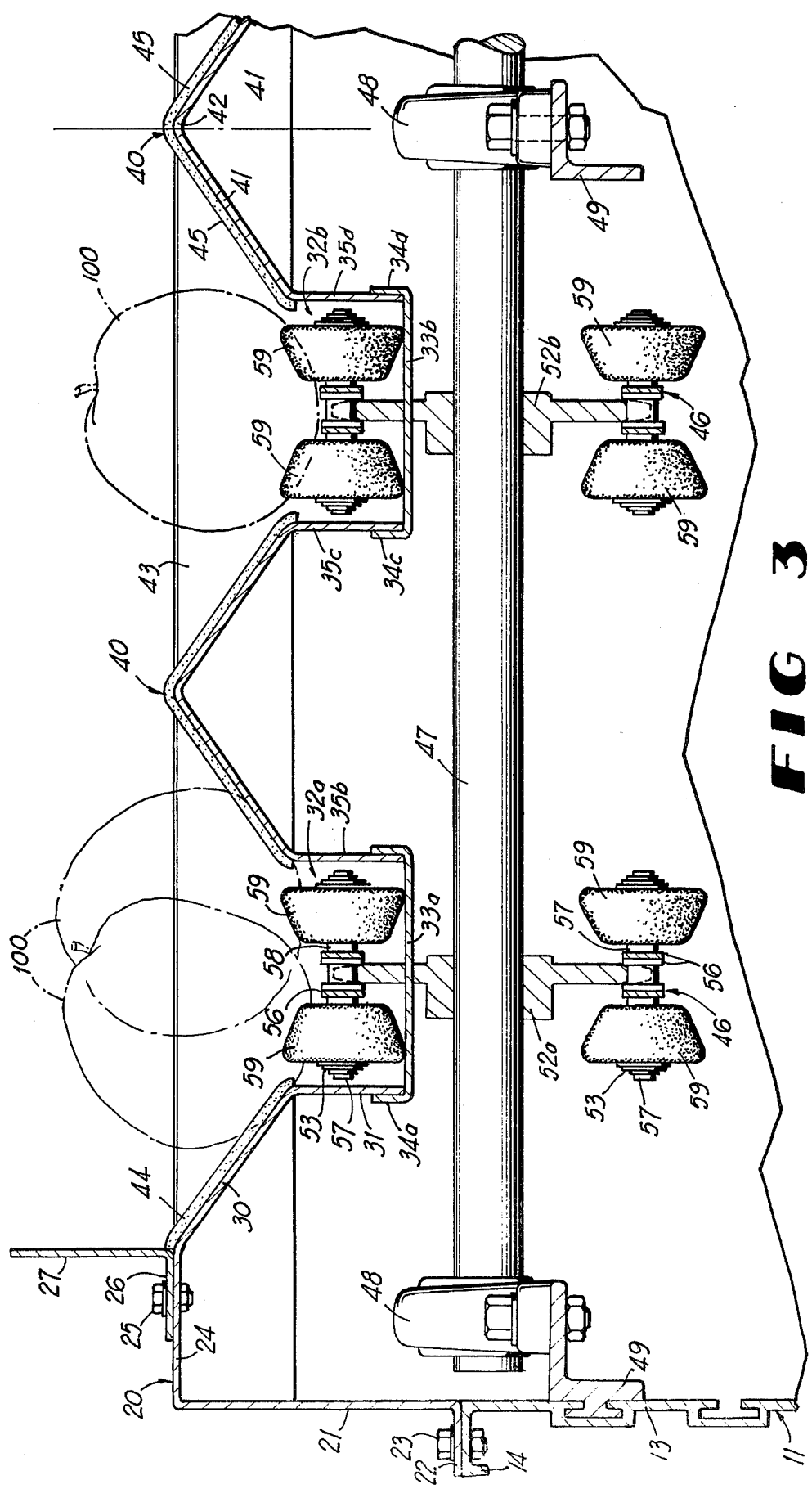
FIG. 3 is a vertical sectional view taken substantially along line 3—3 in FIG. 1.

As seen in FIG. 3, the upper flanges, such as flange 14, carries a trough assembly, denoted generally by the numeral 20. This trough assembly 20 is formed of sheet metal and includes a pair of opposed vertically extending plates, such as plate 21, having outwardly turned lower flanges, such as flange 22, received on the flanges, such as flange 14, and bolted thereto by bolts, such as bolt 23. The plates 21 are bent inwardly to form opposed horizontally disposed inwardly turned flanges 24, to which are bolted by bolts, such as bolt 25, the outwardly protruding flanges, such as flange 26 of opposed side walls, such as wall 27. The inner ends of the inwardly turned flanges 24 are bent downwardly and inwardly to provide downwardly and inwardly inclined deflector walls, such as wall 30. The inner ends of the walls such as wall 30 is bent downwardly to provide a vertical flange, such as flange 31, which forms a portion of an outer conveyor trough, such as conveyor trough 32a.

In the present embodiment there are four lanes of the first or feed conveyor system or mechanism, the lanes being defined by the conveyor troughs 32a, 32b, 32c and 32d which are disposed parallel to each other in transversely spaced relationship. The troughs 32a, 32b, 32c and 32d have flat rectangular bottom plates, such as plate 33a and 33b which have upwardly turned end flanges 34a, 34b, 34c and 34d and extend longitudinally throughout the length of the first conveyor system. The end flange 34a overlaps and joins the lower end portion of vertical wall 31 while the end flanges 34b and 34c receive the vertical wall plates 35b and 35c respectively. End flange 34d overlaps and receives the lower end portion of vertical wall 35d.

Between the troughs 34a, 34b, 34c and 34d are longitudinally extending, peaked deflector members denoted, generally by the numeral 40. As best seen in FIG. 3, each deflector member 40 includes a pair of downwardly and outwardly inclined deflector walls 41 which diverge from an upper apex 42 of member 40. The lower ends of walls 41 are joined to the plates, such as plate 35b and 35c, of the adjacent troughs, i.e., trough 32a and 32b. The upstream ends of members 40 and the walls 30 are joined to an inwardly and downwardly inclined end chute 43, as best seen in FIG. 1. The deflector members 40 and their associated troughs 32a, 32b, 32c and 32d extend approximately one half the entire length of the first conveyor system 20 and terminate at a drop zone denoted generally by the numeral 50. The channels formed by the bottom plates 33a, 33b, 33c and 33d extend beyond this drop zone 50 to terminate below a plurality of pneumatic rollers or tires 51a, 51b, 51c and 51d. The drop zone 50 occupies an intermediate transverse portion of the first conveyor system and downstream of the drop zone 50 the frame structure 10 is provided with additional inclined walls 130 and peaked deflector members 140 which are respectively longitudinally aligned with and complimentary to the walls 30 and the members 40.

The inclined outer surfaces of walls 30 and 41 are provided, at longitudinally spaced intervals with resilient arresting pads, such as pads 44 and 45 which protrude above the inclined surfaces of these walls 30 and 41, respectively, so as to arrest the downstream movement of the excess articles to be sorted, such as the apples 100, which are received on the upper portion of the trough assembly 20 and have not dropped into the conveyors 46.

Within each trough 32a, 32b, 32c and 32d is the upper flight of a continuous chain conveyor, denoted generally by the numeral 46.

At the upstream end of the apparatus, there is provided a first transverse, freely rotatable, sprocket shaft 47, seen in FIG. 3. This transverse sprocket shaft 47 is supported by pillow blocks 48 which are mounted on longitudinally extending angle irons 49 of frame structure 10. The freely rotatable shaft 47 carries transversely spaced sprockets, such as sprockets 52a and 52b which carry the upstream positions of chain conveyors 46, the upper flights of which ride in the troughs 32a, 32b, 32c and 32d. At the downstream end portion of the first conveyor system is a second transverse sprocket shaft or drive shaft 54, seen in FIG. 2, on which the complimentary sprockets (not shown), for receiving the downstream end portions of chains 46, are located.

Figure 2:
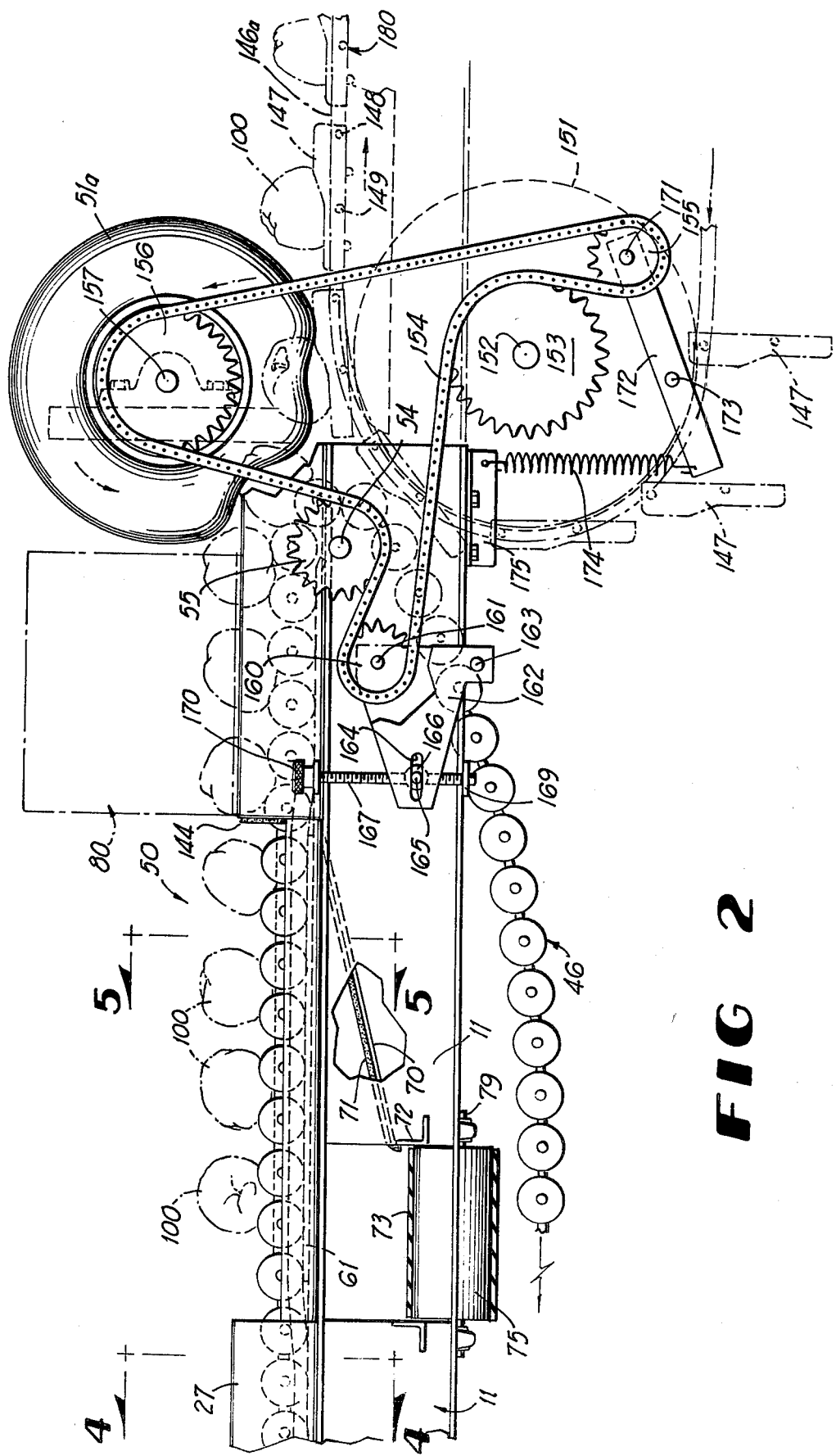
FIG. 2 is a vertical sectional view taken substantially along line 2—2 in FIG. 1.

The shaft 54 is driven by a power transfer sprocket 55 for driving the upper flights of the conveyors 46 in a path from left to right in FIG. 1 and in the direction of the lower arrow in FIGS. 1 and 2.

Each continuous chain conveyor 46 is identical in construction and includes a central chain formed of overlapping links 56. Certain pairs of links 56 are provided with transverse evenly spaced roller shafts 57, the ends of which extend outwardly of the links 56. Inwardly tapered, freely rotatable, frustoconical, transversely spaced, opposed, complimentary rollers 59 are provided, respectively, on these end portions of shaft 57, the inward movement of these rollers 59 being arrested by sleeves, such as sleeve 58, and the outward movement of the rollers 59 being arrested by washers 53, the sleeves 58 and the washers 53 being received on the shafts 57 as best seen in FIG. 3. The peripheries of rollers 59 and indeed, the entire rollers are preferably formed of resilient material, such as rubber so that they will, when desired, frictionally engage the upper surfaces of their respective plates 33a, 33b, 33c and 33d for rotating the aritcles, such as apples 100.

Figure 4:
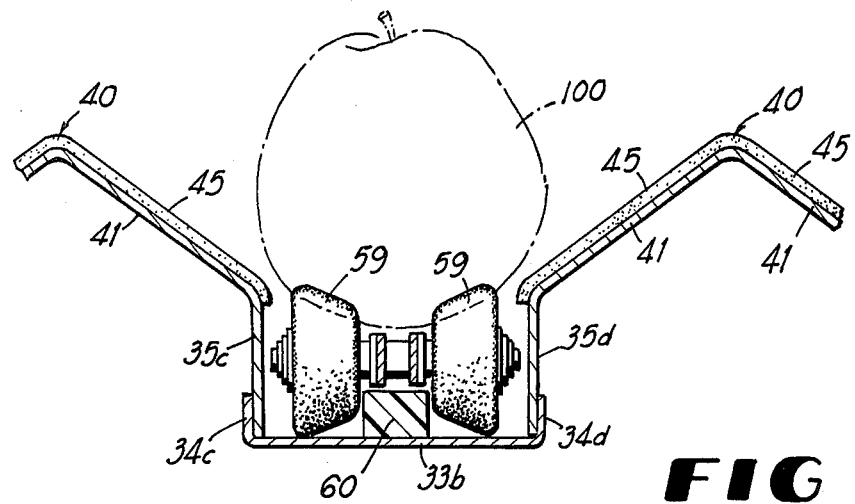
FIG. 4 is a vertical sectional view taken substantially along line 4—4 in FIG. 2.
Figure 5:
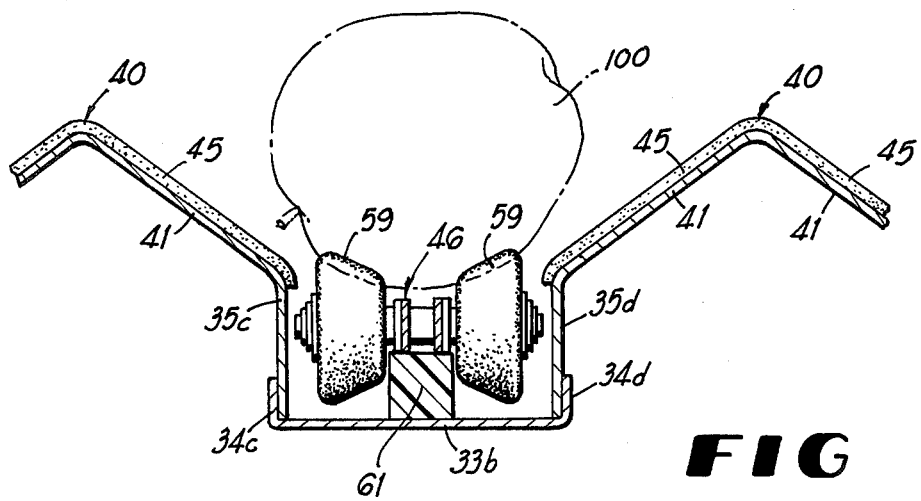
FIG. 5 is a vertical sectional view taken substantially along FIG. 5—5 in FIG. 2.

Along the central portions of the troughs 32a, 32b, 32c, and 32d are upstanding rails formed by successive rail segments, such as rail segments 60 and 61, seen respectively in FIG. 4 and FIG. 5. The width of rail segments 60, 61 is wider than the width of chain conveyor 46 but less wide than the transverse distance between rollers 59. Thus, the rail forms a guide on which the upper flight of conveyors 46 ride. Rail segment 61 is higher than rail segment 60, whereby the lower periphery of rollers 59 frictionally engage the upper surface of plates 33a, 33b, 33c and 33d to be rotated as they are dragged by the chain 46, as seen in FIG. 4; however, as the rail segment 61 lifts the rollers 59, as shown in FIG. 5, these rollers 59 no longer rotate. Rail segment 61 is along only the drop zone 50 area of the troughs and the remainder of the rail is the height of rail segment 60.

It will now be seen that when the articles, such as the apples 100, are deposited onto the upstream end of the first conveyor system, they will be deflected by the opposed inclined walls 30 and 41 on opposite sides of the troughs 33a, 33b, 33c and 33d toward rollers 59 so that the upper peripheries of four adjacent rollers 59 form support means which will receive one article while any excess rests against the walls 30, 41 and are arrested momentarily by the pads 44 and 45 so as to permit the conveyors 46 to arrange the articles, i.e., apples 100, in single file fashion. When the excess of apples 100 are carried beyond the ends of the downwardly converging deflector members 40 and the walls 30, such excess apples will be dropped in the drop zone 50; however, each apple 100 which as been positioned on the upper flight of a conveyor 46 will be carried across the bridge over this zone formed by the plate 33a, 33b, 33c or 33d, into the scanner zone of the first conveyor.

As best seen in FIG. 2, extending transversely across this drop zone below plates 33a, 33b, 33c, 33d is a rearwardly and downwardly inclined return chute 70 the upper surface of which is covered with a resilient sheet 71. The lower end portion of the inclined chute 70 terminates in the central portion of the drop zone 50, being supported on a transverse angle iron 72. A transverse return continuous belt conveyor 73 has its upper flight disposed to receive the returned apples 100. The width of the belt conveyor 73 occupies the forward portion of the drop zone 50 and delivers the returned excess apples 100 to a chute 74, seen in FIG. 1. Rollers such as roller 75 support the ends of the continuous belt conveyor 73, the rollers, such as roller 75, being supported on transverse shafts such as shaft 79. Appropriate means, not shown, drives belt conveyor 73. The belt conveyor 73 thus forms a cross-conveyor which conveys all the apples 100 which are dropped in the drop zone 50 to chute 75 and from chute 75 onto the receiving end of an inclined belt conveyor 77 which discharges onto a return belt 78 which drops the excess apples 100 back into the upstream end of the first conveyor system. Such returned apples are then available to be received on the conveyors 46, provided there is appropriate area available on rollers 59.

As best seen in FIG. 2, the forward end portions of the deflector members 140 and 130 are provided with resilient pads 144 so as to arrest the entry of any excess apples 100 into the scanning zone 80. In the scanning zone 80 is an optical scanner 81 which can be any of a variety of optical scanners which are available on the market. I prefer to employ a scanner such as the scanner of the type depicted in U.S. Pat. No. 3,980,181. As is well known, such scanners operate by measuring the intensity of the green and red light which is reflected from the surface of each article or apple 100 as it passes beneath the scanner 81. A ratio derived from comparing the intensity of the reflected light is fed via wires 201 to a micro-processor 200 and is stored in its random access memory. These weight and color words in storage in the random access computer means, namely microprocessor 200 when read, selectively causes actuation of known solenoids, such as solenoid 205 via wires, such as wire 204 for dictating where the article which has been scanned and weighed will subsequently be dropped by the downstream system. A decoder (not shown) on output shaft 152 synchronizes the second conveyors 146a, 146b, 146c, 146d with computer 200.

Below the end portion of the conveyors 46 are arranged the intake or upstream ends of second or sorting conveyor assembly 180 having conveyor chains 146a, 146b, 146c and 146d which are aligned, longitudinally with the conveyors 46a. The details of the conveyor assembly 180 are shown in my copending application Ser. No. 079,429 filed Sept. 27, 1979 and need not be described in detail here. Suffice it to state, that each cup 147 is towed by a transverse pivot pin 148 of such conveyors while a second pin 149 rides on a rail and supports the cup 147 from dropping. Each cup 147 and its contents such as the apple 100, is towed across a strain gauge 202a, 202b, 202cc, 202d so that its bottom runners 150 are lifted so as to be weighed free and clear of any track of each strain gauge 202a, 202b, 202c, 202d on which the pin 149 rides and free and clear of any weight being carried by the pin 148. The conveyors 146a, 146b, 146c and 146d are driven by sprockets (not shown) at the downstream end of the second conveyor system 180 so that the upstream sprockets 151 drive their transversed take off shaft 152 which, in turn, drives a drive sprocket 153 of FIG. 2.

According to the present invention, a synchronizing linkage includes chain 154, the outer portion of which passes around the downstream side or portion of the sprocket 153 which provides a force for driving the chain 154. Thence, the chain 154 extends downwardly, looping around an idler take-up sprocket 155 and then around the upper periphery of a drive sprocket 156. The drive sprocket 156 is on the end portion of a transverse drive shaft 157 which supports and drives the pneumatic wheels 51a, 51b, 51c and 51d. The sprocket 153 and 156 are of the same diameter and, therefore, will rotate at the same speed, the sprocket 153 driving through the chain 154, the sprocket 156. Brackets 158 and pillow blocks 159 support shaft 157.

From the forward periphery of the sprocket 156, the chain 154 extends downwardly so that its outer portion passes around the rear and bottom periphery of the drive sprocket 55 for imparting a driving action to the shaft 54. From the sprocket 55, the chain 154 extends rearwardly and around the upper rear and lower portion of the periphery of a synchronizer sprocket 160 and thence back to the periphery of the sprocket 153.

The snychronizer sprocket 160 of a take-up assembly is carried by a stub shaft 161 on the end portion of an adjuster plate 162 which forms a bell crank, pivoted about a fixed stub shaft 163 carried by the channel 11. The forward portion of the plate 161 is provided with a longitudinally extending slot 164 within which rides a traveler pin 165. A traveler 166 threadedly engages a vertical adjustment shaft 167 carried by brackets, such as bracket 169, which extend from the beam 11. The shaft 167 is provided with a knurled head 170 which, when rotated, will rotate shaft 167 to move the traveler 165 incrementally upwardly or downwardly, depending upon the direction of rotation of the head 170. This, in turn, will pivot the plate 162 in a clockwise or counter-clockwise direction around the shaft 163, thereby moving in an arcuate path the stub shaft 161 for moving the sprocket 160 forwardly or rearwardly. The idler or take-up sprocket 155 is carried by a shaft 171 on the end of a lever 172, the fulcrum of which is formed by a pivot pin 173 which is fixed on the frame 10 of the machine. A coil spring 174 connected by its upper end to a bracket 175 on the channel 11. Spring 174 edges the sprocket 155 in a clockwise direction, as viewed in FIG. 2. When, however, the sprocket 160 is moved in a counter-clockwise direction by the manipulation of the head 170, the sprocket 155 will move upwardly. When the sprocket 160 is moved in a clockwise direction, the sprocket 155 will move downwardly. Therefore, it is readily seen that by manipulation of the shaft 167 through the head 170, the relative positions of sprockets 153 and 155 with respect to the chain 154 will be altered, thereby advancing or retarding the position of the cups 147 with respect to the position of the end portion of the conveyors 46.

The pneumatic rollers or tires 51a, 51b, 51c, 51d, have very little air in them and therefore readily deform around the outer portion of the items, such as the apples 100, as they are delivered off of the ends of the sprockets 46 so that they are transported gently, respectively into the cups 147 as the cups 147 are arranged to receive them as the cup 147 approaches its tangential position on the upper flight of the conveyor 180.

OPERATION

From the foregoing description, the operation of the present device is quite apparent, articles to be sorted or fed into the upstream end portion of the first conveyor system and sorted into single file by the movement of the upper flights of the conveyors 46, the apples being spun while the upper flights of conveyors 46 move downstream to the beginning of the drop zone 50. In the drop zone 50, each plate 33a, 33b, 33c and 33d is provided with rail 61, seen in FIG. 2. This rail 61 extends across the drop zone 50 and functions to lift each of the chains 46 so as to lift the rollers 59 to positions spaced from and above the plates 33a, 33b, 33c and 33d. Thus, the rollers 59, which have been rotating so as to agitate and align the apples 100 in the sorting zone, do not rotate as the apples 100 are transported gently across the bridge of the drop zone.

The rails segments, such as rail segments 61, terminate adjacent to the scanning zone 50 and therefore the rollers 59 are permitted to again engage the upper surface of the plates 33a, 33b, 33c and 33d and hence the apples 100 begin to be spun again so as to present random areas of each apple for scanning by the scanner 81. Hence, a substantial portion of the surface of each apple 100 is scanned as it passes longitudinally through the scanner 81.

As apples 100 pass beneath scanner 81 green and red light reflected from successive apples are received by the photosensitive cells of the scanner 81 and the signals from the cells are compared to produce an analog ratio signal according to the Irving U.S. Pat. No. 3,750,883, for example. The signal is converted to digital form by a B.C.D. converter (not shown) and stored in the random access memory in the microprocessor 200. The strain gauge 202a, 202b, 202c, or 202d as the case may be, in the weighing zone weighs the apple 100, and the cup 147 and this total weight as well as the weight of the cup 147 alone is stored in memory. From these parameters the appropriate solenoid 205 is tripped for accumulating in selected drop zones, similar apples.

Microprocessor 200 has suitable software which permits the maximum and minimum weight range for an article to be selected for a particular drop zone, i.e., to actuate a particular solenoid 205. These maximum and minimum weight ranges are arranged so that the cut off high weight for one zone is the cut off low weight for the next, etc. After each accumulation of the number sufficient to form one box or bag for a particular zone, the microprocessor 200 automatically adjusts the cut off points, up or down, as determined by whether too much or too little weight had been accumulted for one bag or box, so that the next bag or box will probably approach more nearly the ideal weight of articles set for a designated drop zone. Ideally, the adjustment of cut off points will be in 0.1 ounce increments.

The microprocessor 200 also totalizes the number of articles fed to each zone and their total weight. The desired count or number of articles, for a bag or box can, therefore, be entered to the microprocessor 200 for a particular drop zone.

It will be obvious to those skilled in the art that many variations may be made in the embodiment here chosen for the purpose of illustrating the present invention without departing from the scope thereof is defined by the appended claims.

I claim:

1. Apparatus for sorting articles comprising:
    (a) a first conveyor system having conveyor support means for arranging and supporting articles in succession in respective lanes and for feeding such articles toward a discharge end of said first system, said first system having a drive shaft rotating to drive said conveyor support means;
    (b) a sorting conveyor system having a take-off shaft rotating adjacent to said drive shaft and successive cups moveable with and around said take-off shaft and adjacent to the discharge end of said first conveyor system for respectively receiving said articles as they are discharged from said first conveyor system;
    (c) linkage means connected between said drive shaft and said take-off shaft through which the rotation of said drive shaft is synchronized with the rotation of said take-off shaft;
    (d) means for adjusting said linkage means for adjusting the relative positions of said support means and said cup;
    (e) said linkage means including a sprocket on said drive shaft, a sprocket on said take off shaft, a synchronizing chain extending around the sprocket of said drive shaft and the sprocket of said take off shaft and means engaging said synchronizing chain for moving the same to alter the drive of said drive shaft with respect to said take off shaft.
    (f) said linkage means including a pair of sprockets engaging said chain for moving said chain to adjust the relative angular positions of the sprocket of said drive shaft and the sprocket of said take off shaft.

2. The apparatus defined in claim 1 including a lever carrying one of the movable sprockets and pivot means carrying the other of the movable sprockets, and means for incrementally moving said pivot means.

3. In a process of sorting articles fed along a prescribed path by discharging articles of similar weight ranges in prescribed zones, and wherein a prescribed weight respectively forms a high weight cut off point for one adjacent drop zone and a low weight cut off point for another adjacent drop zone, the step of automatically adjusting the cut off points for a prescribed zone after a prescribed numbers of articles have been accumulated in each zone, according to the total weight of the prescribed number of articles so as to improve the probability that the next accumulation of the prescribed number of articles for that zone will more nearly approach said prescribed weight.

4. The process defined in claim 3 wherein the adjustment of the cutoff points are in 0.1 oz increments.

5. Apparatus for sorting articles of the type having:
(a) a frame;
(b) a singulator conveyor system on said frame characterized by a first moveable chain, a shaft carried by said frame, a sprocket on said shaft and over which said chain passes, and spaced article supporting means connected to said shaft for being moved by said chain in a down stream direction in the upper flight of said chain, said article supporting means supporting articles fed to the up stream end portion of said singulator conveyor system for being transported and arranged in single file evenly spaced fashion as the article supporting means are moved down stream toward the discharge end of said singulator conveyor system and for discharging the arranged articles successively from the discharge end of said singulator conveyor system;
(c) a sorting conveyor system on said frame having upper flight with an up stream intake end adjacent to said discharge end of said singulator conveyor system and characterized by a second continuous chain, a second shaft carried by said frame adjacent to said first shaft, a second sprocket on said second shaft and over which said second continuous chain passes from said up stream intake end to a down stream discharge end, and a plurality of successive evenly spaced cups connected to said second chain for movement in succession in a continuous path, said cups being moveable by the upper flight of said second continuous chain in a down stream direction and in a path adjacent to said discharge end of said first conveyor system, said cups respectively receiving the discharged articles from said singulator conveyor system, said first shaft and said second shaft being disposed transversely parallel and adjacent to each other; and
(d) means for driving one of the systems whereby one of the shafts is rotated as that system is driven;
wherein the improvement comprises:
(e) a pair of additional sprockets respectively on said shafts;
(f) a continuous synchronizing chain having spaced outer portions of said chain extending partially around and engaging portions of said additional sprockets, a looped portion of said sychronizing chain extending in one direction away from said additional sprockets;
(g) a moveable mounted synchronizer sprocket receiving the looped end portion of said synchronizing chain;
(h) a pair of guide sprockets adjacent to said additional sprockets, one of said guide sprockets being resiliently biased for movement away from said additonal sprockets, said synchronizing chain passing around said guide sprockets, outwardly of said additional sprockets; and
(i) means for incrementally moving said synchronizer sprocket toward and away from said additonal sprockets.

6. The apparatus for sorting articles defined in claim 5 including a support shaft, said other of said guide sprockets being mounted on said support shaft for rotating the same when said synchronizing chain is driven, and a pneumatic wheeel carried by said support shaft over the adjacent ends of said singulator conveyor system and said sorting conveyor system for engaging said articles as the same are transferred from one system to the other.

7. The apparatus for sorting articles defined in claim 6 wherein said means for incrementally moving said synchronizer sprocket includes a bell crank pivotally mounted on said frame, said synchronizer sprocket being carried by a portion of said bellcrank which is spaced from the pivotal mounting of said bellcrank, and a screw connected between said frame and another portion of said bellcrank for rotation to incrementally move said bellcrank.

* * * * *